(12) United States Patent
Zhao et al.

(10) Patent No.: US 12,101,801 B2
(45) Date of Patent: Sep. 24, 2024

(54) METHOD PERFORMED BY USER EQUIPMENT, AND USER EQUIPMENT

(71) Applicant: SHARP KABUSHIKI KAISHA, Sakai (JP)

(72) Inventors: Yinan Zhao, Shanghai (CN); Renmao Liu, Shanghai (CN); Chao Luo, Shanghai (CN)

(73) Assignee: SHARP KABUSHIKI KAISHA, Sakai (JP)

(*) Notice: Subject to any disclaimer, the term of this patent is extended or adjusted under 35 U.S.C. 154(b) by 352 days.

(21) Appl. No.: 17/629,111

(22) PCT Filed: Jul. 30, 2020

(86) PCT No.: PCT/CN2020/105760
§ 371 (c)(1),
(2) Date: Jan. 21, 2022

(87) PCT Pub. No.: WO2021/018236
PCT Pub. Date: Feb. 4, 2021

(65) Prior Publication Data
US 2022/0279525 A1    Sep. 1, 2022

(30) Foreign Application Priority Data

Aug. 1, 2019 (CN) .......................... 201910710711.0

(51) Int. Cl.
*H04W 72/56*    (2023.01)
*H04W 72/0446*    (2023.01)
(Continued)

(52) U.S. Cl.
CPC ....... *H04W 72/56* (2023.01); *H04W 72/0446* (2013.01); *H04W 72/0453* (2013.01); *H04W 72/20* (2023.01)

(58) Field of Classification Search
CPC .......... H04W 4/40; H04W 4/46; H04W 4/70; H04W 72/02; H04W 72/51; H04W 72/535; H04W 72/56–569
See application file for complete search history.

(56) References Cited

U.S. PATENT DOCUMENTS

2019/0387377 A1    12/2019 Zhang et al.
2020/0187162 A1*   6/2020 Luo ..................... H04W 72/542
(Continued)

FOREIGN PATENT DOCUMENTS

CN    108632781 A    10/2018

OTHER PUBLICATIONS

Huawei et al., "New WID on 3GPP V2X Phase 2", RP-170798, 3GPP TSG RAN Meeting #75, Dubrovnik, Croatia, Mar. 6-9, 2017.
(Continued)

*Primary Examiner* — Pao Sinkantarakorn
(74) *Attorney, Agent, or Firm* — ScienBiziP, P.C.

(57) ABSTRACT

The present invention provides a method performed by user equipment and user equipment. The method includes: receiving sidelink configuration information transmitted by a base station as first configuration information; receiving a sidelink reference signal received power (RSRP) threshold list SL-ThresPSSCH-RSRP-List transmitted by the base station; receiving sidelink control information (SCI) transmitted by other user equipment; and determining a threshold of reference signal received power (RSRP) according to configuration information of a sensing priority included in the first configuration information, namely second configuration information sensingPriority-r15, and/or priority indication information $prio_{RX}$ included in the SCI.

2 Claims, 11 Drawing Sheets

(51) Int. Cl.
   *H04W 72/0453* (2023.01)
   *H04W 72/20* (2023.01)

(56) References Cited

U.S. PATENT DOCUMENTS

| | | | | |
|---|---|---|---|---|
| 2020/0196279 | A1* | 6/2020 | Thomas | H04W 72/04 |
| 2020/0229006 | A1* | 7/2020 | Chen | H04W 72/04 |
| 2020/0296690 | A1* | 9/2020 | Lee | H04W 4/40 |
| 2020/0383114 | A1* | 12/2020 | Zhang | H04W 72/0446 |

OTHER PUBLICATIONS

Qualcomm Incorporated, "Work Item Proposal for Enhanced LTE Device to Device Proximity Services", RP-142311, 3GPP TSG RAN Meeting #66, Maui, USA, Dec. 8-11, 2014.

LG Electronics et al., "New WI proposal: Support for V2V services based on LTE sidelink", RP-152293, 3GPP TSG RAN Meeting #70, Sitges, Spain, Dec. 7-10, 2015.

Qualcomm Incorporated, "Work item proposal on LTE Device to Device Proximity Services", RP-140518, 3GPP TSG RAN Meeting #63, Fukuoka, Japan, Mar. 3-6, 2014.

"3rd Generation Partnership Project; Technical Specification Group Radio Access Network; Evolved Universal Terrestrial Radio Access (E-UTRA); Radio Resource Control (RRC);Protocol specification(Release 15)", 3GPP TS 36.331 V15.6.0 (Jun. 2019).

* cited by examiner

METHOD PERFORMED BY USER EQUIPMENT, AND USER EQUIPMENT

TECHNICAL FIELD

The present invention relates to the technical field of wireless communications, and in particular to a method performed by user equipment, and corresponding user equipment.

BACKGROUND

In conventional cellular networks, all communication needs to be forwarded via base stations. By contrast, D2D communication (device-to-device communication, device-to-device direct communication) refers to a direct communication method between two pieces of user equipment without forwarding via a base station or a core network. A research project on the use of LTE equipment to implement proximity D2D communication services was approved at the 3rd Generation Partnership Project (3GPP) RAN #63 plenary meeting in March 2014 (see Non-Patent Document 1). Functions introduced in the LTE Release 12 D2D include:
1) a discovery function between proximate devices in an LTE network coverage scenario;
2) a direct broadcast communication function between proximate devices; and
3) support for unicast and groupcast communication functions at higher layers.

A research project on enhanced LTE eD2D (enhanced D2D) was approved at the 3GPP RAN #66 plenary meeting in December 2014 (see Non-Patent Document 2). Main functions introduced in the LTE Release 13 eD2D include:
1) a D2D discovery in out-of-coverage and partial-coverage scenarios; and
2) a priority handling mechanism for D2D communication.

Based on the design of the D2D communication mechanism, a V2X feasibility research project based on D2D communication was approved at the 3GPP RAN #68 plenary meeting in June 2015. V2X stands for Vehicle to Everything, and intends to implement information exchange between a vehicle and all entities that may affect the vehicle, for the purpose of reducing accidents, alleviating traffic congestion, reducing environmental pollution, and providing other information services. Application scenarios of V2X mainly include four aspects:
1) V2V, Vehicle to Vehicle, i.e., vehicle-to-vehicle communication;
2) V2P, Vehicle to Pedestrian, i.e., a vehicle transmits alarms to a pedestrian or a non-motorized vehicle;
3) V2N: Vehicle-to-Network, i.e., a vehicle connects to a mobile network;
4) V2I: Vehicle-to-Infrastructure, i.e., a vehicle communicates with road infrastructure.

3GPP divides the research and standardization of V2X into three stages. The first stage was completed in September 2016, and was mainly focused on V2V and based on LTE Release 12 and Release 13 D2D (also known as sidelink communication), that is, the development of proximity communication technologies (see Non-Patent Document 3). V2X stage 1 introduced a new D2D communication interface referred to as PC5 interface. The PC5 interface is mainly intended to address the issue of cellular Internet of Vehicle (IoV) communication in high-speed (up to 250 km/h) and high-node density environments. Vehicles can exchange information such as position, speed, and direction through the PC5 interface, that is, the vehicles can communicate directly through the PC5 interface. Compared with the proximity communication between D2D devices, functions introduced in LTE Release 14 V2X mainly include:
1) higher density DMRS to support high-speed scenarios;
2) introduction of subchannels to enhance resource allocation methods; and
3) introduction of a user equipment sensing mechanism with semi-persistent scheduling.

The second stage of the V2X research project belonged to the LTE Release 15 research category (see Non-Patent Document 4). Main features introduced included high-order 64QAM modulation, V2X carrier aggregation, short TTI transmission, as well as feasibility study of transmit diversity.

The second-stage research of the V2X project also included supporting user equipment in Transmission Mode 3 and user equipment in Transmission Mode 4 to share a radio resource pool (see Non-Patent Document 4). In a first-stage research of the V2X project, for the user equipment in Transmission Mode 3, the base station may dynamically or semi-statically allocate sidelink transmission resources to the user equipment, and the base station can ensure that the allocated resources and transmission resources used by the user equipment in Transmission Mode 4 are non-overlapping. If sharing of the radio resource pool performed between the user equipment in Transmission Mode 3 and the user equipment in Transmission Mode 4 is activated, then since the base station eNB cannot obtain a use status of the resource pool, the base station cannot ensure that the resources allocated to the user equipment in Transmission Mode 3 and the transmission resources for the user equipment in sensing-based Transmission Mode 4 are non-overlapping. On this basis, the second-stage research of the V2X project introduced sensing measurement and reporting for the user equipment in Transmission Mode 3.

The solution of the present invention mainly includes a method in which an RSRP threshold of a DMRS corresponding to a PSSCH is determined when user equipment in Transmission Mode 3 performs sensing measurement and reporting.

PRIOR ART DOCUMENT

Non-Patent Documents

Non-Patent Document 1: RP-140518, Work item proposal on LTE Device to Device Proximity Services
Non-Patent Document 2: RP-142311, Work Item Proposal for Enhanced LTE Device to Device Proximity Services
Non-Patent Document 3: RP-152293, New WI proposal: Support for V2V services based on LTE sidelink
Non-Patent Document 4: RP-170798, New WID on 3GPP V2X Phase 2

SUMMARY

In order to address at least part of the aforementioned issues, the present invention provides a method performed by user equipment, and user equipment.

The method performed by user equipment according to a first aspect of the present invention comprises: receiving sidelink configuration information transmitted by a base station as first configuration information; receiving a sidelink reference signal received power (RSRP) threshold list SL-ThresPSSCH-RSRP-List transmitted by the base station; receiving sidelink control information (SCI) transmitted by other user equipment; and determining a threshold of RSRP according to configuration information of a sensing priority comprised in the first configuration information, namely second configuration information sensingPriority-r15, and/or priority indication information $prio_{RX}$ comprised in the SCI.

In the method performed by user equipment according to the first aspect of the present invention, the base station is an evolved eNB; and/or a transmission mode of the user equipment is Transmission Mode 3; and/or the base station transmits the first configuration information by means of a radio resource control (RRC) information element; and/or the first configuration information is configuration information of sensing measurement and reporting of Transmission Mode 3; and/or the SCI is in SCI format 1; and/or the $prio_{RX}$ is 3 bits; and/or the value of the $prio_{RX}$ is any integer from 0 to 7; and/or the threshold of the RSRP is equal to the $i^{th}$ threshold in the SL-ThresPSSCH-RSRP-List.

In the method performed by user equipment according to the first aspect of the present invention, the value of the second configuration information sensingPriority-r15 is any integer from 1 to 8.

In the method performed by user equipment according to the first aspect of the present invention, the value of the second configuration information sensingPriority-r15 is any integer from 1 to 7.

In the method performed by user equipment according to the first aspect of the present invention, i is obtained by means of the following formula: $i=(sensingPriority\text{-}r15-1)\times 8+prio_{RX}+1$.

In the method performed by user equipment according to the first aspect of the present invention, i is obtained by means of the following formula: $i=(sensingPriority\text{-}r15)\bmod 8+prio_{RX}+1$.

In the method performed by user equipment according to the first aspect of the present invention, i is obtained by means of the following formula: $i=sensingPriority\text{-}r15\times 8+prio_{RX}+1$.

The method performed by user equipment according to a second aspect of the present invention comprises: determining a sidelink reference signal received power (RSRP) threshold list SL-ThresPSSCH-RSRP-List; receiving sidelink control information (SCI) transmitted by other user equipment; and determining a threshold of RSRP according to transmission priority information $prio_{TX}$ indicated by higher layers and/or priority indication information $prio_{RX}$ comprised in the SCI.

In the method performed by user equipment according to the second aspect of the present invention, a transmission mode of the user equipment is sensing-based Transmission Mode 4; and/or the SCI is in SCI format 1; and/or the priority indication information $prio_{RX}$ is 3 bits; and/or the value of the $prio_{RX}$ is any integer from 0 to 7; and/or the $prio_{TX}$ is 3 bits; and/or the value of the $prio_{TX}$ is any integer from 0 to 7; and/or the threshold of the RSRP is equal to the $i^{th}$ threshold in the SL-ThresPSSCH-RSRP-List, where $i=prio_{TX}\bmod 8+prio_{RX}+1$.

The user equipment according to a third aspect of the present invention comprises: a processor; and a memory storing instructions, wherein the instructions, when run by the processor, perform the method according to any one of claims 1 to 9.

BRIEF DESCRIPTION OF THE DRAWINGS

The above and other features of the present invention will be more apparent from the following detailed description in combination with the accompanying drawings, in which.

DETAILED DESCRIPTION

Figure 1:
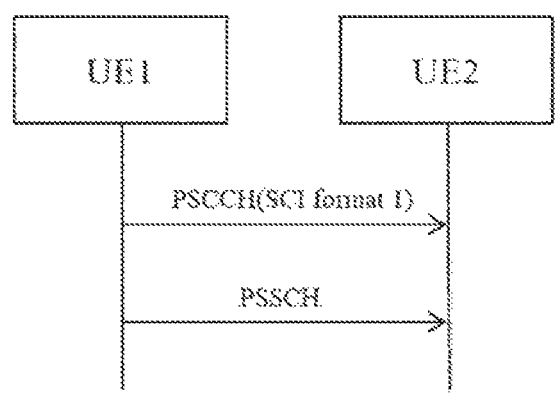
FIG. 1 is a schematic diagram showing sidelink communication of LTE V2X UE.

The following describes the present invention in detail with reference to the accompanying drawings and specific embodiments. It should be noted that the present invention should not be limited to the specific embodiments described below. In addition, detailed descriptions of well-known technologies not directly related to the present invention are omitted for the sake of brevity, in order to avoid obscuring the understanding of the present invention.

In the following description, a 5G mobile communication system and its later evolved versions are used as exemplary application environments to set forth a plurality of embodiments according to the present invention in detail. However, it is to be noted that the present invention is not limited to the following implementations, but is applicable to many other wireless communication systems, such as a communication system after 5G and a 4G mobile communication system before 5G.

Some terms involved in the present invention are described below. Unless otherwise specified, the terms used in the present invention adopt the definitions herein. The terms provided in the present invention may vary in LTE, LTE-Advanced, LTE-Advanced Pro, NR, and subsequent communication systems, but unified terms are used in the present invention. When applied to a specific system, the terms may be replaced with terms used in the corresponding system.

3GPP: 3rd Generation Partnership Project
LTE: Long Tenn Evolution
NR: New Radio
PDCCH: Physical Downlink Control Channel
DCI: Downlink Control Information
PDSCH: Physical Downlink Shared Channel
UE: User Equipment
eNB: evolved NodeB, evolved base station gNB: NR base station
TTI: Transmission Time Interval
OFDM: Orthogonal Frequency Division Multiplexing
C-RNTI: Cell Radio Network Temporary Identifier
CSI: Channel State Indicator
HARQ: Hybrid Automatic Repeat Request
CSI-RS: CSI-Reference Signal, channel state measurement reference signal
CRS: Cell Reference Signal
PUCCH: Physical Uplink Control Channel
PUSCH: Physical Uplink Shared Channel
UL-SCH: Uplink Shared Channel
CG: Configured Grant
Sidelink: Sidelink communication
SCI: Sidelink Control Information
PSCCH: Physical Sidelink Control Channel
MCS: Modulation and Coding Scheme
RB: Resource Block
CRB: Common Resource Block
CP: Cyclic Prefix
PRB: Physical Resource Block
PSSCH: Physical Sidelink Shared Channel
FDM: Frequency Division Multiplexing
RRC: Radio Resource Control
RSRP: Reference Signal Receiving Power
SRS: Sounding Reference Signal
DMRS: Demodulation Reference Signal
CRC: Cyclic Redundancy Check
PSDCH: Physical Sidelink Discovery Channel
PSBCH: Physical Sidelink Broadcast Channel
SFI: Slot Format Indication
TDD: Time Division Duplexing
FDD: Frequency Division Duplexing
SIB1: System Information Block Type 1
SIB21: System Information Block Type 21
SLSS: Sidelink Synchronization Signal
PSSS: Primary Sidelink Synchronization Signal
SSSS: Secondary Sidelink Synchronization Signal
PCI: Physical Cell ID
PSS: Primary Synchronization Signal
SSS: Secondary Synchronization Signal
BWP: Bandwidth Part
GNSS: Global Navigation Satellite System
SFN: System Frame Number (radio frame number)
DFN: Direct Frame Number
IE: Information Element
SSB: Synchronization Signal Block
EN-DC: EUTRA-NR Dual Connection
MCG: Master Cell Group
SCG: Secondary Cell Group
PCell: Primary Cell
SCell: Secondary Cell
PSFCH: Physical Sidelink Feedback Channel
SPS: Semi-Persistent Scheduling
TA: Timing Advance The following is a description of the prior art associated with the solution of the present invention. Unless otherwise specified, the same terms in the specific embodiments have the same meanings as in the prior art.

It is worth pointing out that the V2X and sidelink mentioned in the description of the present invention have the same meaning. The V2X herein can also mean sidelink; similarly, the sidelink herein can also mean V2X, and no specific distinction and limitation will be made in the following text.

The resource allocation mode of V2X (sidelink) communication and the transmission mode of V2X (sidelink) communication in the description of the present invention can be replaced equivalently. The resource allocation mode involved in the description can mean transmission mode, and the transmission mode involved can mean resource allocation mode.

All LTE Sidelink (V2X) Transmission Mode 3 (Mode 3, or Resource Allocation Mode 3) involved in the description of the present invention may also refer to other transmission modes in LTE sidelink (V2X) communication based on base station (eNB or gNB) scheduling (or referred to as based on scheduling), such as Transmission Mode 5.

Sensing measurement and reporting of Transmission Mode 3 involved in the description of the present invention are represented by sensing and reporting.

The PSCCH in the description of the present invention is used to carry SCI. The PSSCH associated with or relevant to or corresponding to or scheduled by PSCCH involved in the description of the present invention has the same meaning, and all refer to an associated PSSCH or a corresponding PSSCH. Similarly, the PSCCH associated with or relevant to or corresponding to PSSCH involved in the description has the same meaning, and all refer to an associated PSCCH or a corresponding PSCCH. It is worth pointing out that the PSCCH associated with or relevant to or corresponding to PSSCH may be one PSCCH or two PSCCHs. When the PSCCH associated with or relevant to or corresponding to PSSCH includes two PSCCHs (or, two pieces of SCI), in the description of this patent, the two are referred to as a PSCCH carrying first-level SCI and a PSCCH carrying second-level SCI.

The DMRS associated with PSSCH (or DMRS for PSSCH) involved in the description of the present invention is used to demodulate the PSSCH.

The higher layers involved in the description of the present invention refer to a MAC layer of sidelink user equipment, or a sidelink (V2X) application layer, or an AS layer, or a NAS layer, and the present invention does not impose any limitation thereon.

The mod operation in the description of the present invention refers to a remainder operation, that is, a mod b is equal to a remainder obtained by dividing a by b. For example, 7 mod 8=7, and 8 mod 8=0.

Sidelink Communication Scenario

1) Out-of-coverage sidelink communication: Both pieces of UE performing sidelink communication are out of network coverage (for example, the UE cannot detect any cell that meets a "cell selection criterion" on a frequency at which sidelink communication needs to be performed, and that means the UE is out of network coverage).
2) In-coverage sidelink communication: Both pieces of UE performing sidelink communication are in network coverage (for example, the UE detects at least one cell that meets a "cell selection criterion" on a frequency at which sidelink communication needs to be performed, and that means the UE is in network coverage).
3) Partial-coverage sidelink communication: One of two pieces of UE performing sidelink communication is out of network coverage, and the other is in network coverage.

From the perspective of a UE side, the UE has only two scenarios, out-of-coverage and in-coverage. Partial-coverage is described from the perspective of sidelink communication.

Basic Procedure of LTE V2X (Sidelink) Communication

FIG. 1 is a schematic diagram showing sidelink communication of LTE V2X UE. First, UE1 transmits to UE2 sidelink control information (SCI format 1), which is carried by a physical layer channel PSCCH. The SCI format 1 includes scheduling information of a PSSCH, such as frequency domain resources and the like of the PSSCH. Secondly, the UE1 transmits to the UE2 sidelink data, which is carried by the physical layer channel PSSCH. The PSCCH and the corresponding PSSCH are frequency division multiplexed, that is, the PSCCH and the corresponding PSSCH are located in the same subframe in the time domain and are located on different PRBs in the frequency domain. Specific design methods of the PSCCH and the PSSCH are as follows:

1) The PSCCH occupies one subframe in the time domain and two consecutive PRBs in the frequency domain. Initialization of a scrambling sequence uses a predefined value 510. The PSCCH may carry the SCI format 1, where the SCI format 1 includes at least frequency domain resource information of the PSSCH. For example, for a frequency domain resource indication field, the SCI format 1 indicates a starting sub-channel number and the number of consecutive sub-channels of the PSSCH corresponding to the PSCCH.
2) The PSSCH occupies one subframe in the time domain, and uses frequency division multiplexing (FDM) with the corresponding PSCCH. The PSSCH occupies one or a plurality of consecutive sub-channels in the frequency domain. The sub-channel represents $n_{subCHsize}$ consecutive PRBs in the frequency domain. $n_{subCHsize}$ is configured by an RRC parameter, and a starting sub-channel and the number of consecutive sub-channels are indicated by the frequency domain resource indication field of the SCI format 1.

Resource Allocation Mode (Transmission Mode 3/4) of LTE V2X

Figure 2:
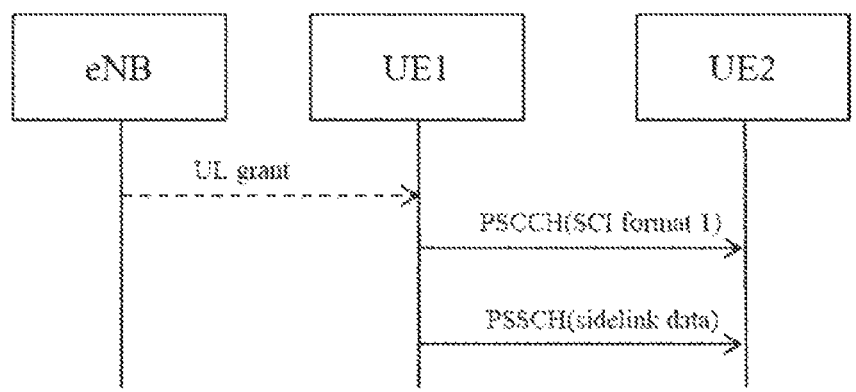
FIG. 2 is a schematic diagram showing a resource allocation mode of LTE V2X.

FIG. 2 shows two resource allocation modes of LTE V2X, and the two are respectively referred to as a base station scheduling-based resource allocation (Transmission Mode 3) mode and a UE sensing-based resource allocation (Transmission Mode 4) mode. In LTE V2X, in eNB network coverage, a base station can configure, through UE-level dedicated RRC signaling SL-V2X-ConfigDedicated, a resource allocation mode of UE, or referred to as a transmission mode of the UE, which is specifically as follows:

1) Base station scheduling-based resource allocation mode (Transmission Mode 3): the base station scheduling-based resource allocation mode means that frequency domain resources used in sidelink communication are from scheduling of the base station. Transmission Mode 3 includes two scheduling modes, which are dynamic scheduling and semi-persistent scheduling (SPS), respectively. For dynamic scheduling, a UL grant (DCI format 5A) includes the frequency domain resources of the PSSCH, and a CRC of a PDCCH or an EPDCCH carrying the DCI format 5A is scrambled by an SL-V-RNTI. For SPS, the base station configures one or a plurality of (at most 8) configured grants through IE: SPS-ConfigSL-r14, and each configured grant includes a grant index and a resource period of the grant. The UL grant (DCI format 5A) includes the frequency domain resource of the PSSCH, indication information (3 bits) of the grant index, and indication information of SPS activation or release (or deactivation). The CRC of the PDCCH or the EPDCCH carrying the DCI format 5A is scrambled by an SL-SPS-V-RNTI.

Specifically, when RRC signaling SL-V2X-ConfigDedicated is set to scheduled-r14, it indicates that the UE is configured in the base station scheduling-based resource allocation mode. The base station configures the SL-V-RNTI or the SL-SPS-V-RNTI via RRC signaling, and transmits the UL grant to the UE through the PDCCH or the EPDCCH (DCI format 5A, the CRC is scrambled by the SL-V-RNTI or the SL-SPS-V-RNTI). The UL grant includes at least scheduling information of the PSSCH frequency domain resource in sidelink communication. When the UE successfully detects the PDCCH or the EPDCCH scrambled by the SL-V-RNTI or the SL-SPS-V-RNTI, the UE uses a PSSCH frequency domain resource indication field in the UL grant (DCI format 5A) as PSSCH frequency domain resource indication information in a PSCCH (SCI format 1), and transmits the PSCCH (SCI format 1) and a corresponding PSSCH.

For SPS in Transmission Mode 3, the UE receives, on a downlink subframe n, the DCI format 5A scrambled by the SL-SPS-V-RNTI. If the DCI format 5A includes the indication information of SPS activation, then the UE determines frequency domain resources of the PSSCH according to the indication information in the DCI format 5A, and determines time domain resources of the PSSCH (transmission subframes of the PSSCH) according to information such as the subframe n and the like.

2) UE sensing-based resource allocation mode (Transmission Mode 4): the UE sensing-based resource allocation mode means that resources for sidelink communication are based on a procedure of sensing of a candidate available resource set performed by the UE. In the UE sensing-based transmission mode, the UE determines, according to a certain rule (for a detailed description of the procedure, see the LTE V2X UE sensing procedure section), a sidelink transmission resource in a transmission resource pool configured (or pre-configured) by the base station, and transmits a PSCCH (SCI format 1) and a corresponding PSSCH.

In case of out of eNB network coverage on a frequency tor sidelink communication, LTE V2X only supports the UE sensing-based resource allocation mode, that is, only Transmission Mode 4 is supported. In the UE sensing-based transmission mode, the UE determines, according to a certain rule (for a detailed description of the procedure, see the LTE V2X UE sensing procedure section), a sidelink transmission resource in a pre-configured transmission resource pool and transmits a PSCCH (SCI format 1) and a corresponding PSSCH.

Method for LTE V2X to Determine PSSCH Subframe Resource Pool

In LTE V2X, a method for determining a subframe resource pool is based on all subframes in a range of SFN #0 to SFN #1023, a total of 10240 subframes. Herein, a subframe set that may belong to a PSSCH subframe resource pool transmitted by V2X UE is represented as $(t_0^{SL}, t_1^{SL}, \ldots, t_{T_{max}}^{SL})$, which meets:

1) $0 \leq t_i^{SL} < 10240$.
2) subframes in the above subframe set are numbered relative to subframe #0 of SFN #0 or DFN #0, namely, a subframe with $t_i^{SL}=0$ corresponds to subframe #0 of SFN #0 or DFN #0,
3) the above subframe set includes all subframes after the following subframes (subframes included in a, b, and c) are excluded:

a) subframes configured with an SLSS, the number of which is represented as $N_{SLSS}$;

b) downlink subframes and special subframes in a TDD cell, the number of which is represented as $N_{dssf}$;

c) reserved subframes, where a method for determining the reserved subframes is: after $N_{SLSS}$ and $N_{dssf}$ subframes are excluded from all subframes with subframe numbers 0-10239, the remaining (10240−$N_{SLSS}$−$N_{dssf}$) subframes are arranged in ascending order of subframe numbers, which can be represented herein as ($l_0, l_1, \ldots, l_{10240-N_{SLSS}-N_{dssf}-1}$). $r=\text{floor}(m \cdot (10240-N_{SLSS}-N_{dssf})/N_{reserved})$, where $m=0, 1, \ldots, N_{reserved}-1$, and $N_{reserved}=(10240-N_{SLSS}-N_{dssf}) \bmod L_{bitmap}$, $L_{bitmap}$ represents the length of a bitmap configured for the resource pool and is configured by an upper layer, and the bitmap may be represented as ($b_0, b_1, \ldots, b_{L_{bitmap}-1}$), in which a subframe corresponding to the number of $l_r$ is a reserved subframe; and 4) the subframes in the subframe set are arranged in ascending order of subframe numbers.

A method for the UE to determine the PSSCH subframe resource pool is: for subframe $t_k^{SL}$, in the subframe set ($t_0^{SL}, t_1^{SL}, \ldots, t_{T_{max}}^{SL}$), if $b_{k'}=1$, where $k'=k \bmod L_{bitmap}$, then subframe $t_k^{SL}$ belongs to the PSSCH subframe resource pool.

Reserved Resource for LTE V2X Transmission Mode 4 (Transmission Mode 4)

In LTE V2X Transmission Mode 4, when UE determines resources for sidelink communication transmission through a sensing procedure, the UE reserves resources for periodic service data. Assuming that a subframe resource determined by the UE for transmitting a PSSCH is represented as subframe $t_m^{SL}$, then the UE reserves the resource in subframe $t_{m+j \times P_{rsvp\_TX}}^{SL}$, where $j=1, 2, \ldots, C_{resel}-1$, $C_{resel}=10 \times$ SL_RESOURCE_RESELECTION_COUNTER, and SL_RESOURCE_RESELECTION_COUNTER is configured by a higher layer. If the higher layer does not configure the parameter, then $C_{resel}=1$. $P_{rsvp\_TX}=P_{step} \times P_{rsvp\_TX}/100$. LTE V2X includes a periodic service, and the period of service generation is approximately $P_{serv}=100$ ms, where $P_{step}$ represents the number of uplink subframes available in $P_{serv}$. The following Table 1 shows the values of $P_{step}$ in different TDD uplink and downlink configuration information in LTE V2X. For example, for TDD UL/DL configuration information 2, each system frame includes two uplink subframes. In a service period of $P_{serv}=100$ ms, there are a total of 20 uplink subframes. Table 1 shows determination of $P_{step}$ for edge connection Transmission Modes 3 and 4, as shown in the following table for details.

TABLE 1

Determination of $P_{step}$

|  | $P_{step}$ |
| --- | --- |
| UL/DL configuration information 0 of TDD | 60 |
| UL/DL configuration information 1 of TDD | 40 |
| UL/DL configuration information 2 of TDD | 20 |
| UL/DL configuration information 3 of TDD | 30 |
| UL/DL configuration information 4 of TDD | 20 |
| UL/DL configuration information 5 of TDD | 10 |
| UL/DL configuration information 6 of TDD | 50 |
| Other | 100 |

$P_{rsvp\_TX}$ represents a resource reservation interval indicated by an upper layer.

Determination of Resource Reservation Indication Field in SCI Format 1 Performed by LTE V2X UE A resource reservation interval indicated by an upper layer is represented as $P_{rsvp\_TX}$. UE determines the value of $X=P_{rsvp\_TX}/100$ according to the indication of the upper layer, and in conjunction with the following Table 2, the UE can determine a resource reservation indication field (4-bit indication field) in SCI.

TABLE 2

| Resource reservation indication field in SCI | X | Specific description |
| --- | --- | --- |
| '0001', '0010', . . . , '1010' | Value of indication field in SCI | $1 \leq X \leq 10$. |
| '1011' | 0.5 | X = 0.5 |
| '1100' | 0.2 | X = 0.2 |
| '0000' | 0 | Upper layer indicates no reserved resources |
| '1101', '1110', '1111' | Reserved value | |

UE Sensing Procedure in LTE V2X Transmission Mode 4

For a sensing procedure of UE, generally speaking, in LTE V2X Transmission Mode 4, an upper layer requests sidelink data to be transmitted in subframe #n. In subframe $t_{n'-10 \times P_{step}}^{SL}, t_{n'-10 \times P_{step}+1}^{SL}, \ldots, t_{n'-1}^{SL}$, the UE monitors SCI format 1 transmitted by other UE, and the UE determines, according to the successfully decoded SCI format 1, an available resource in a candidate resource set between subframe #(n+T1) and subframe #(n+T2), and reports the determined available resource to the upper layer. If subframe #n belongs to a subframe set ($t_0^{SL}, t_1^{SL}, \ldots, t_{T_{max}}^{SL}$), then $t_{n'}^{SL}=n$; otherwise, $t_{n'}^{SL}$ indicates the first subframe of the subframe set ($t_0^{SL}, t_1^{SL}, \ldots, t_{T_{max}}^{SL}$) following subframe #n. T1 and T2 depend on a specific implementation of the UE.

Each element in the candidate resource set between subframe #(n+T1) and subframe #(n+T2), namely, each candidate resource, can be referred to as a candidate single subframe resource, which is represented by using $R_{x,y}$. The specific definition of $R_{x,y}$ is:

1) x represents consecutive $L_{subCH}$ sub-channels #(x+j) in the frequency domain, where $j=0, 1, \ldots, L_{subCH}-1$; and 2) y represents a time domain subframe $t_y^{SL}$.

The UE assumes that between subframe #(n+T1) and subframe #(n+T2), any consecutive $L_{subCH}$ sub-channels belonging to a PSSCH resource pool correspond to one candidate single subframe resource. The candidate resource set is represented by using $S_A$.

A resource reservation indication field in the SCI format 1 received by the UE in subframe $t_m^{SL}$ is denoted as $P_{rsvp\_RX}$. If PSSCH resource blocks and subframe resources indicated in SCI format 1 received by the UE in subframe $t_m^{SL}$ or the UE assumes that the PSSCH resource blocks and subframe resources indicated in the same SCI format 1 received in subframe $t_{m+q \times P_{step} \times P_{rsvp\_RX}}^{SL}$ overlap or partially overlap with a candidate single subframe resource $R_{x,y+j \times P_{rsvp\_TX}}$, then the UE excludes the candidate single subframe resource $R_{x,y}$ from $S_A$, where $q=1, 2, \ldots, Q$, and $j=1, 2, \ldots, C_{resel}-1$. If $P_{rsvp\_RX}<1$ and $n'-m \leq P_{step} \times P_{rsvp\_RX}$, then $Q=1/P_{rsvp\_RX}$; otherwise, $Q=1$.

It is worth pointing out that sensing and reporting of Transmission Mode 3 includes the aforementioned sensing procedure of the UE in Transmission Mode 4, and also includes a procedure in which RSRP of a DMRS corresponding to a received PSSCH is compared with a threshold determined by the UE. That is, in the sensing and reporting procedure of Transmission Mode 3, exclusion of the candidate single subframe resource $R_{x,y}$ from $S_A$ performed by the UE needs to simultaneously meet the following two conditions: 1) if the PSSCH resource blocks and subframe resources indicated in SCI format 1 received by the UE in subframe $t_m^{SL}$ or the UE assumes that the PSSCH resource blocks and subframe resources indicated in the same SCI format 1 received in subframe $t_{m+q \times P_{step} \times P_{rsvp\_RX}}^{SL}$ overlap or partially overlap with the candidate single subframe resource $R_{x,y+j \times P_{rsvp\_TX}}$; 2) the RSRP of the DMRS corresponding to the PSSCH is greater than an RSRP threshold determined by the UE. Therefore, the present invention provides a method for the UE to determine an RSRP threshold in sensing and reporting of Transmission Mode 3. On the basis that the RSRP threshold is determined and that condition 1 is met, the UE can compare the magnitude of the determined RSRP threshold and the magnitude of the RSRP of the DMRS corresponding to the PSSCH so as to determine whether to exclude the candidate single subframe resource $R_{x,y}$ from $S_A$.

DMRS Associated with PSSCH (or DMRS for PSSCH)

In demodulation and decoding of the PSSCH, an associated DMRS is used to performed channel estimation. For a DMRS associated with PSSCH in LTE V2X, the DMRS and the PSSCH are located on the same PRB in the frequency domain. Time domain resources of the DMRS are OFDM symbol 2 and OFDM symbol 5 of the first slot in a subframe where the PSSCH is located, and include OFDM symbol 1 and OFDM symbol 4 of the second slot in this subframe.

RSRP of DMRS Associated with PSSCH

The RSRP of the DMRS associated with PSSCH represents received power of the DMRS, namely, represents an average value of received power of DMRSs of all REs in one OFDM symbol. The present invention does not impose any limitation thereon. The RSRP of the DMRS is in units of dBm, and the present invention also does not impose any limitation thereon. All RSRP involved in the description of the present invention can represent the RSRP of the DMRS associated with PSSCH.

RRC Information Element SL-ThresPSSCH-RSRP-List

The RRC information element SL-ThresPSSCH-RSRP-List represents a list of RSRP thresholds. The list includes a total of 64 thresholds, and each threshold is represented by any integer within [0, 66], where 0 refers to negative infinity dBm, 66 refers to positive infinity dBm, and other integer values n refer to $(-128+(n-1) \times 2)$ dBm. For Transmission Mode 3, the base station may configure the RRC information element SL-ThresPSSCH-RSRP-List in SIB21, or may configure the SL-ThresPSSCH-RSRP-List in UE-specific RRC signaling. For Transmission Mode 4, the base station may configure the RRC information element SL-ThresPSSCH-RSRP-List in SIB21, or may configure the SL-ThresPSSCH-RSRP-List in UE-specific RRC signaling; alternatively, the SL-ThresPSSCH-RSRP-List is included in pre-configuration information (or information element SL-V2X-Preconfiguration) of sidelink user equipment.

CRC Calculation

Before CRC calculation, bits are represented as $a_0, a_1, \ldots, a_{A-1}$ (a total of A bits). After CRC calculation, L parity bits (or referred to as an L-bit check code) are added behind $a_0, a_1, \ldots, a_{A-1}$. The L parity bits are represented as $p_0, p_1, \ldots, p_{L-1}$. The A+L bits can be expressed as a polynomial $a_0 D^{A+L-1} + a_1 D^{A+L-2} + \ldots + a_{A-1} D^L + p_0 D^{L-1} + p_1 D^{L-2} + \ldots + p_{L-1}$; that is, $a_0$ represents the highest bit, and $p_{L-1}$ represents the lowest bit. A CRC generator polynomial is (if L=24) $g_{CRC24A}(D) = D^{24} + D^{23} + D^{18} + D^{17} + D^{14} + D^{11} + D^{10} + D^7 + D^6 + D^5 + D^4 + D^3 + D + 1$, or $g_{CRC24B}(D) = D^{24} + D^{23} + D^6 + D^5 + D + 1$, or $g_{CRC24C}(D) = D^{24} + D^{23} + D^{21} + D^{20} + D^{17} + D^{15} + D^{13} + D^{12} + D^8 + D^4 + D^2 + 1$. $a_0 D^{A+L-1} + a_1 D^{A+L-2} + \ldots + a_{A-1} D^L + p_0 D^{L-1} + p_1 D^{L-2} + \ldots + p_{L-1}$ obtained after CRC calculation is divisible by $g_{CRC24A}(D)$ or $g_{CRC24B}(D)$ or $g_{CRC24C}(D)$, that is, a remainder of $a_0 D^{A+L-1} + a_1 D^{A+L-2} + \ldots + a_{A-1} D^L + p_0 D^{L-1} + p_1 D^{L-2} + \ldots + p_{L-1}$ divided by $g_{CRC24A}(D)$ or $g_{CRC24B}(D)$ or $g_{CRC24C}(D)$ is 0 (L=24). The division used herein follows a calculation rule for a finite field, and binary operation employing only 0 and 1 is used. In addition, an exclusive OR operation (the same results in 0, and a difference results in 1) rule is used in the division; for example, a remainder of 100101 divided by 1110 is 1, and a remainder of 101100110100 divided by 11001 is 0.

Scrambling of Block of Bits

Before scrambling, a block of bits is represented as $b_0, b_1, \ldots, b_{M_{bit}-1}$, where $M_{bit}$ represents the number of bits in the block of bits. After being subjected to scrambling, the block of bits is represented as $b_0', b_1', \ldots, b_{M_{bit}-1}'$, meeting $b'_n = (b_n + c(n))$ mod 2, where $0 \leq n \leq M_{bit}-1$, and a method for determining a scrambling code sequence $c(n)$ is as follows:

$$c(n) = (x_1(n+N_c) + x_2(n+N_c)) \bmod 2$$

$$x_1(n+31) = (x_1(n+3) + x_1(n)) \bmod 2$$

$$x_2(n+31) = (x_2(n+3) + x_2(n+2) + x_2(n+1) + x_2(n)) \bmod 2$$

where $N_c = 1600$, and an initialization sequence of the first sequence $x_1(n)$ is $x_1(0)=1$, where $x_1(n)=0$, and $n=1, 2, \ldots, 30$. An initialization sequence of the second sequence $x_2(n)$ can be represented as $c_{init} = \Sigma_{i=0}^{30} x_2(i) \times 2^i$, that is, $c_{init}$ represents the decimal value of the initialization sequence of the sequence $x_2(n)$. After the value of $c_{init}$ is determined, the initialization sequence of $x_2(n)$ can be obtained (the length of the initialization sequence is also 31), and then $x_2(n)$ can be determined; and then, by combining with $x_1(n)$ (the length of the initialization sequence is equal to 31), the UE can determine the scrambling code sequence $c(n)$. Therefore, the solution of this patent provides a method for determining $c_{init}$. On this basis, the sequence $x_2(n)$ can be determined, and on the basis that the sequence $x_1(n)$ is provided, the scrambling code sequence $c(n)$ can be determined.

Decimal Value of Sequence and Decimal Value of Concatenate Sequence

If it is assumed that a sequence has a length of $L_s$ and can be represented as $s_0, s_1, \ldots, s_{L_s-1}$, then the decimal value of this sequence is equal to $\Sigma_{i=0}^{L_s-1} s_i \times 2^{L_s-1-i}$ or equal to $\Sigma_{i=0}^{L_s-1} s_i \times 2^i$ (respectively indicating that the highest bit of this sequence is $s_0$ and $s_{L_s-1}$; the present invention does not impose any limitation on the highest bit of the sequence, and the highest bit of the sequence may be $s_0$ and may also be $s_{L_s-1}$).

If it is assumed that a first sequence has a length of $L_{s1}$ and can be represented as $s1_0, s1_1, \ldots, s1_{L_{s1}-1}$, and a second sequence has a length of $L_{s2}$ and can be represented as $s2_0, s2_1, \ldots, s2_{L_{s2}-1}$, then the decimal value of a concatenate sequence of the first sequence and the second sequence is equal to $\Sigma_{i=0}^{L_{s2}-1} s1_i \times 2^{L_{s1}+L_{s2}-1-i} + \Sigma_{i=0}^{L_{s2}-1} s2_i \times 2^{L_{s2}-1-i}$, or equal to $\Sigma_{i=0}^{L_{s2}-1} s2_i \times 2^{L_{s1}+L_{s2}-1-i} + \Sigma_{i=0}^{L_{s1}-1} s1_i \times 2^{L_{s1}-1-i}$ (the two cases respectively correspond to a case in which the highest bit of the sequence is $s1_0$ and a case in which the highest bit of the sequence is $s2_0$) or equal to $\Sigma_{i=0}^{L_{s1}-1} s1_i \times 2^i + \Sigma_{i=0}^{L_{s2}-1} s2_i \times 2^{L_{s1}+i}$, or equal to $\Sigma_{i=0}^{L_{s1}-1} s2_i \times 2^i + \Sigma_{i=0}^{L_{s1}-1} s1_i \times 2^{L_{s2}+i}$ (the two cases respectively correspond to a case in which the highest bit of the sequence is $s1_{L_{s1}-1}$ and a case in which the highest bit of the sequence is $s2_{L_{s2}-1}$).

It is worth pointing out that the concatenate sequence involved in the description of the present invention includes but is not limited to two sequences. A method for calculating the decimal value of a concatenate sequence including three sequences is similar to the method for calculating the decimal value of the concatenate sequence including two sequences, which will not be described herein again.

Hereinafter, specific examples and embodiments related to the present invention are described in detail. In addition, as described above, the examples and embodiments described in the present disclosure are illustrative descriptions for facilitating understanding of the present invention, rather than limiting the present invention.

Embodiment 1

Figure 3:
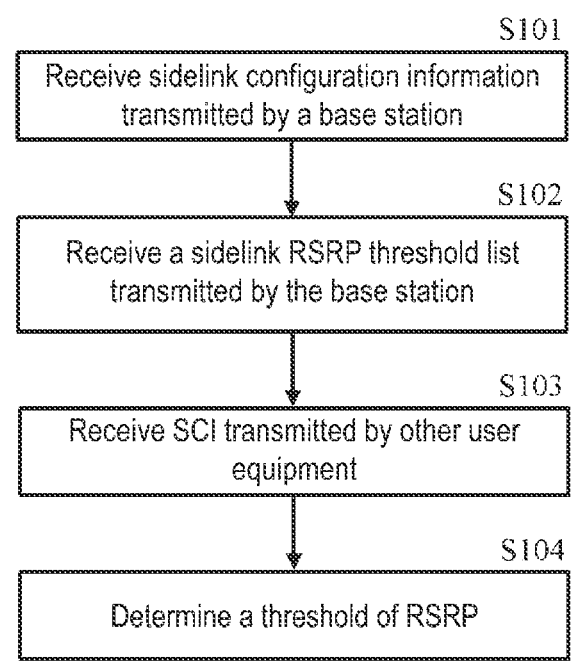
FIG. 3 is a schematic diagram showing a basic procedure of a method performed by user equipment according to Embodiment 1 of the invention.

FIG. 3 is a schematic diagram showing a basic procedure of a method performed by user equipment according to Embodiment 1 of the present invention.

The method performed by user equipment according to Embodiment 1 of the present invention is described in detail below in conjunction with the basic procedure diagram shown in FIG. 3.

As shown in FIG. 3, in Embodiment 1 of the present invention, steps performed by the user equipment include the following steps.

In step S101, sidelink user equipment receives sidelink configuration information transmitted by a base station.

Optionally, the base station is an eNB.

Optionally, a transmission mode of the sidelink user equipment is Transmission Mode 3.

Optionally, the base station transmits the sidelink configuration information by means of an RRC information element MeasSensing-Config.

Optionally, the sidelink configuration information is configuration information of sensing and reporting of Transmission Mode 3. Optionally, the configuration information of sensing and reporting of Transmission Mode 3 includes configuration information of a sensing priority (represented by using sensingPriority-r15). Optionally, the value of sensingPriority-r15 is any integer from 1 to 8.

In step S102, the sidelink user equipment receives a sidelink RSRP threshold list SL-ThresPSSCH-RSRP-List transmitted by the base station.

Optionally, the base station transmits the SL-ThresPSSCH-RSRP-List by means of SIB21 or UE-specific RRC signaling.

In step S103, the sidelink user equipment receives sidelink control information (SCI) transmitted by other user equipment.

Optionally, the SCI is in SCI format 1.

Optionally, the SCI includes priority indication information (represented by using the $prio_{RX}$). Optionally, the priority indication information $prio_{RX}$ is 3 bits. Optionally, the value of the $prio_{RX}$ is any integer from 0 to 7.

In step S104, the sidelink user equipment determines a threshold of RSRP according to the configuration information sensingPriority-r15 of the sensing priority and/or the priority indication information $prio_{RX}$.

Optionally, the sidelink user equipment determines that the threshold of the RSRP is equal to the $i^{th}$ threshold in the SL-ThresPSSCH-RSRP-List. Optionally, i=(sensingPriority-r15−1)×8+$prio_{RX}$+1.

Embodiment 2

Figure 4:
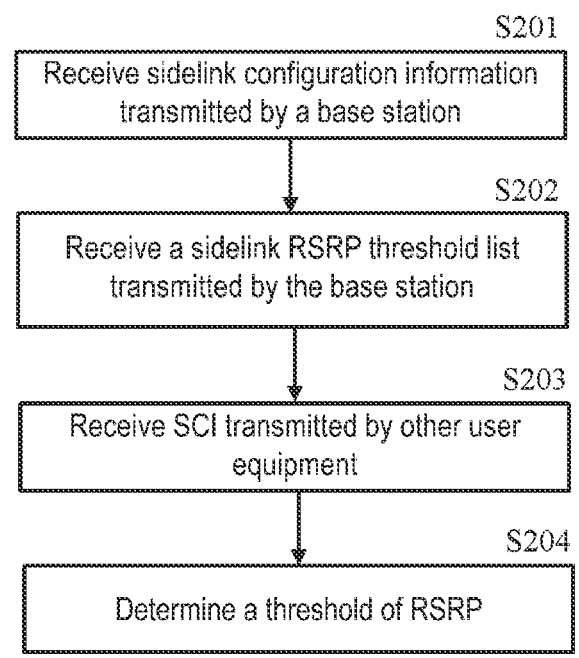
FIG. 4 is a schematic diagram showing a basic procedure of a method performed by user equipment according to Embodiment 2 of the invention.

FIG. 4 is a schematic diagram showing a basic procedure of a method performed by user equipment according to Embodiment 2 of the present invention.

The method performed by user equipment according to Embodiment 2 of the present invention is described in detail below in conjunction with the basic procedure diagram shown in FIG. 4.

As shown in FIG. 4, in Embodiment 2 of the present invention, steps performed by the user equipment include the following steps.

In step S201, sidelink user equipment receives sidelink configuration information transmitted by a base station.

Optionally, the base station is an eNB.

Optionally, a transmission mode of the sidelink user equipment is Transmission Mode 3.

Optionally, the base station transmits the sidelink configuration information by means of an RRC information element MeasSensing-Config.

Optionally, the sidelink configuration information is configuration information of sensing and reporting of Transmission Mode 3. Optionally, the configuration information of sensing and reporting of Transmission Mode 3 includes configuration information of a sensing priority (represented by using sensingPriority-r15). Optionally, the value of sensingPriority-r15 is any integer from 1 to 8.

In step S202, the sidelink user equipment receives a sidelink RSRP threshold list SL-ThresPSSCH-RSRP-List transmitted by the base station.

Optionally, the base station transmits the SL-ThresPSSCH-RSRP-List by means of SIB21 or UE-specific RRC signaling.

In step S203, the sidelink user equipment receives sidelink control information (SCI) transmitted by other user equipment.

Optionally, the SCI is in SCI format 1.

Optionally, the SCI includes priority indication information (represented by using $prio_{RX}$). Optionally, the priority indication information $prio_{RX}$ is 3 bits. Optionally, the value of the $prio_{RX}$ is any integer from 0 to 7.

In step S204, the sidelink user equipment determines a threshold of RSRP according to the configuration information sensingPriority-r15 of the sensing priority and/or the priority indication information $prio_{RX}$.

Optionally, the sidelink user equipment determines that the threshold of the RSRP is equal to the $i^{th}$ threshold in the SL-ThresPSSCH-RSRP-List. Optionally, i=(sensingPriority-r15)mod 8+$prio_{RX}$+1.

Embodiment 3

Figure 5:
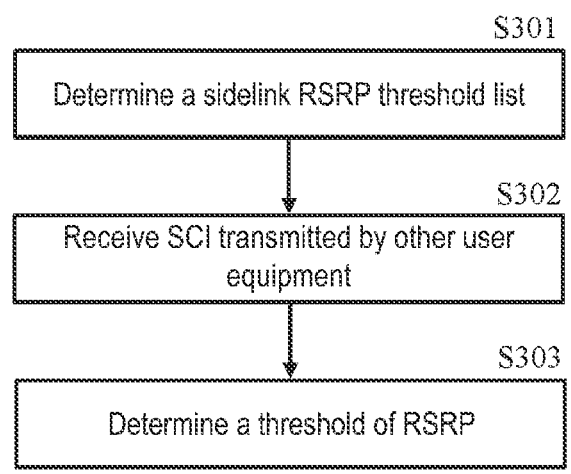
FIG. 5 is a schematic diagram showing a basic procedure of a method performed by user equipment according to Embodiment 3 of the present invention.

FIG. 5 is a schematic diagram showing a basic procedure of a method performed by user equipment according to Embodiment 3 of the present invention.

The method performed by user equipment according to Embodiment 3 of the present invention is described in detail below in conjunction with the basic procedure diagram shown in FIG. 5.

As shown in FIG. 5, in Embodiment 3 of the present invention, steps performed by the user equipment include the following steps.

In step S301, sidelink user equipment determines a sidelink RSRP threshold list SL-ThresPSSCH-RSRP-List.

Optionally, a base station transmits the SL-ThresPSSCH-RSRP-List by means of SIB21 or UE-specific RRC signaling, or optionally, the SL-ThresPSSCH-RSRP-List is included in pre-configuration information (SL-V2X-PreconfigFreqInfo-r14) of the user equipment.

In step S302, the sidelink user equipment receives sidelink control information (SCI) transmitted by other user equipment.

Optionally, a transmission mode of the sidelink user equipment is sensing-based Transmission Mode 4.

Optionally, the SCI is in SCI format 1.

Optionally, the SCI includes priority indication information (represented by using $prio_{RX}$). Optionally, the priority indication information $prio_{RX}$ is 3 bits. Optionally, the value of the $prio_{RX}$ is any integer from 0 to 7.

In step S303, the sidelink user equipment determines a threshold of RSRP according to transmission priority information (represented by using $prio_{TX}$) indicated (or provided) by higher layers and/or the priority indication information $prio_{RX}$.

Optionally, the transmission priority information $prio_{TX}$ is 3 bits. Optionally, the value of the $prio_{TX}$ is any integer from 0 to 7.

Optionally, the sidelink user equipment determines that the threshold of the RSRP is equal to the $i^{th}$ threshold in the SL-ThresPSSCH-RSRP-List. Optionally, i=$prio_{TX}$ mod 8+$prio_{RX}$+1.

Embodiment 4

Figure 6:
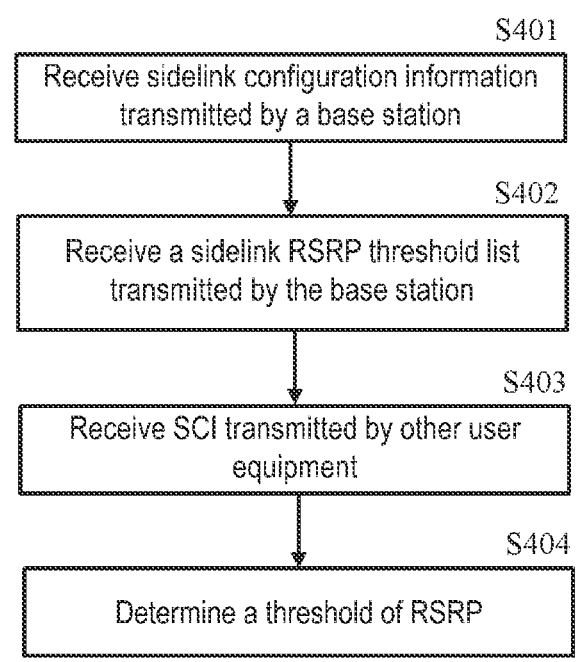
FIG. 6 is a schematic diagram showing a basic procedure of a method performed by user equipment according to Embodiment 4 of the present invention.

FIG. 6 is a schematic diagram showing a basic procedure of a method performed by user equipment according to Embodiment 4 of the present invention.

The method performed by user equipment according to Embodiment 4 of the present invention is described in detail below in conjunction with the basic procedure diagram shown in FIG. 6.

As shown in FIG. 6, in Embodiment 4 of the present invention, steps performed by the user equipment include the following steps.

In step S401, sidelink user equipment receives sidelink configuration information transmitted by a base station.

Optionally, the base station is an eNB.

Optionally, a transmission mode of the sidelink user equipment is Transmission Mode 3.

Optionally, the base station transmits the sidelink configuration information by means of an RRC information element MeasSensing-Config.

Optionally, the sidelink configuration information is configuration information of sensing and reporting of Transmission Mode 3. Optionally, the configuration information of sensing and reporting of Transmission Mode 3 includes configuration information of a sensing priority (represented by using sensingPriority-r15). Optionally, the value of sensingPriority-r15 is any integer from 0 to 7.

In step S402, the sidelink user equipment receives a sidelink RSRP threshold list SL-ThresPSSCH-RSRP-List transmitted by the base station.

Optionally, the base station transmits the SL-ThresPSSCH-RSRP-List by means of SIB21 or UE-specific RRC signaling.

In step S403, the sidelink user equipment receives sidelink control information (SCI) transmitted by other user equipment.

Optionally, the SCI is in SCI format 1.

Optionally, the SCI includes priority indication information (represented by using $prio_{RX}$). Optionally, the priority indication information $prio_{RX}$ is 3 bits. Optionally, the value of the $prio_{RX}$ is any integer from 0 to 7.

In step S404, the sidelink user equipment determines a threshold of RSRP according to the configuration information sensingPriority-r15 of the sensing priority and/or the priority indication information $prio_{RX}$.

Optionally, the sidelink user equipment determines that the threshold of the RSRP is equal to the $i^{th}$ threshold in the SL-ThresPSSCH-RSRP-List. Optionally, i=sensingPriority-r15×8+$prio_{RX}$+1.

Embodiment 5

Figure 7:
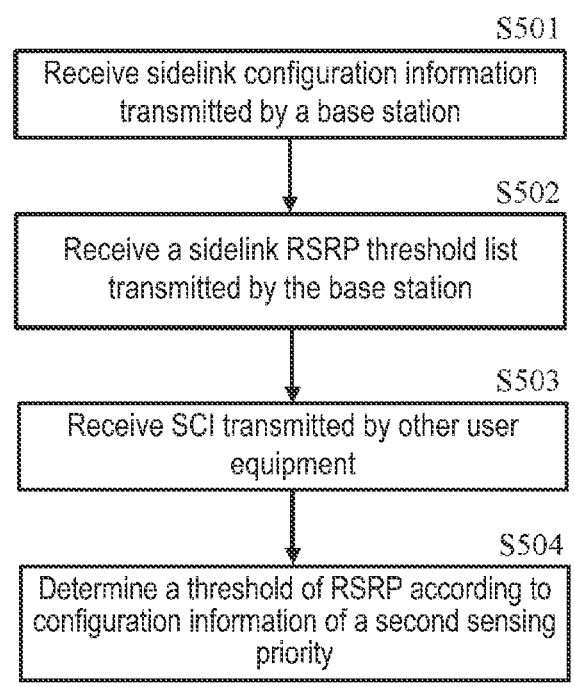
FIG. 7 is a schematic diagram showing a basic procedure of a method performed by user equipment according to Embodiment 5 of the present invention.

FIG. 7 is a schematic diagram showing a basic procedure of a method performed by user equipment according to Embodiment 5 of the present invention.

The method performed by user equipment according to Embodiment 5 of the present invention is described in detail below in conjunction with the basic procedure diagram shown in FIG. 7.

As shown in FIG. 7, in Embodiment 5 of the present invention, steps performed by the user equipment include the following steps.

In step S501, sidelink user equipment receives sidelink configuration information transmitted by a base station.

Optionally, the base station is an eNB.

Optionally, a transmission mode of the sidelink user equipment is Transmission Mode 3.

Optionally, the base station transmits the sidelink configuration information by means of an RRC information element MeasSensing-Config.

Optionally, the sidelink configuration information is configuration information of sensing and reporting of Transmission Mode 3. Optionally, the configuration information of sensing and reporting of Transmission Mode 3 includes configuration information of a first sensing priority (represented by using sensingPriority-r15), and/or configuration information of a second sensing priority (represented by using sensingPriority-v1560, or sensingPriority-v1570, or sensingPriority-r1560, or sensingPriority-r1570). Optionally, the value of the configuration information of the first sensing priority is any integer from 1 to 8. Optionally, the value of the configuration information of the second sensing priority is any integer from 0 to 7.

Optionally, if the configuration information of sensing and reporting of Transmission Mode 3 includes the configuration information of the second sensing priority, then the sidelink user equipment ignores the configuration information of the first sensing priority.

In step S502, the sidelink user equipment receives a sidelink RSRP threshold list SL-ThresPSSCH-RSRP-List transmitted by the base station.

Optionally, the base station transmits the SL-ThresPSSCH-RSRP-List by means of SIB21 or UE-specific RRC signaling.

In step S503, the sidelink user equipment receives sidelink control information (SCI) transmitted by other user equipment.

Optionally, the SCI is in SCI format 1.

Optionally, the SCI includes priority indication information (represented by using $prio_{RX}$). Optionally, the priority indication information $prio_{RX}$ is 3 bits, Optionally, the value of the $prio_{RX}$ is any integer from 0 to 7.

In step S504, the sidelink user equipment determines a threshold of RSRP according to the configuration information sensingPriority-v1560 (or sensingPriority-v1570, or sensingPriority-v1560, or sensingPriority-r1570) of the second sensing priority and/or the priority indication information $prio_{RX}$.

Optionally, the sidelink user equipment determines that the threshold of the RSRP is equal to the $i^{th}$ threshold in the SL-ThresPSSCH-RSRP-List. Optionally, i=sensingPriority-v1560 (or sensingPriority-v1570, or sensingPriority-r1560, or sensingPriority-r1570)×8+$prio_{RX}$+1.

Embodiment 6

Figure 8:
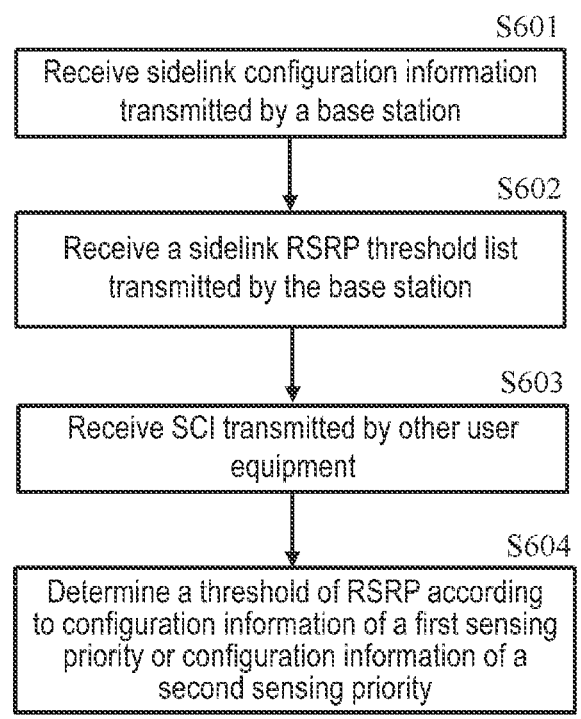
FIG. 8 is a schematic diagram showing a basic procedure of a method performed by user equipment according to Embodiment 6 of the present invention.

FIG. 8 is a schematic diagram showing a basic procedure of a method performed by user equipment according to Embodiment 6 of the present invention.

The method performed by user equipment according to Embodiment 6 of the present invention is described in detail below in conjunction with the basic procedure diagram shown in FIG. 8.

As shown in FIG. 8, in Embodiment 6 of the present invention, steps performed by the user equipment include the following steps.

In step S601, sidelink user equipment receives sidelink configuration information transmitted by a base station.

Optionally, the base station is an eNB.

Optionally, a transmission mode of the sidelink user equipment is Transmission Mode 3.

Optionally, the base station transmits the sidelink configuration information by means of an RRC information element MeasSensing-Config.

Optionally, the sidelink configuration information is configuration information of sensing and reporting of Transmission Mode 3. Optionally, the configuration information of sensing and reporting of Transmission Mode 3 includes configuration information of a first sensing priority (represented by using sensingPriority-r15), and/or configuration information of a second sensing priority (represented by using sensingPriority-v1560, or sensingPriority-v1570, or sensingPriority-r1560, or sensingPriority-r1570). Optionally, the value of the configuration information of the first sensing priority is any integer from 1 to 8. Optionally, the value of the configuration information of the second sensing priority is 0.

Optionally, if the configuration information of sensing and reporting of Transmission Mode 3 includes the configuration information of the second sensing priority, then the sidelink user equipment ignores the configuration information of the first sensing priority.

In step S602, the sidelink user equipment receives a sidelink RSRP threshold list SL-ThresPSSCH-RSRP-List transmitted by the base station.

Optionally, the base station transmits the SL-ThresPSSCH-RSRP-List by means of SIB21 or UE-specific RRC signaling.

In step S603, the sidelink user equipment receives sidelink control information (SCI) transmitted by other user equipment.

Optionally, the SCI is in SCI format 1.

Optionally, the SCI includes priority indication information (represented by using $prio_{RX}$). Optionally, the priority indication information $prio_{RX}$ is 3 bits. Optionally, the value of the $prio_{RX}$ is any integer from 0 to 7.

In step S604, the sidelink user equipment determines a threshold of RSRP according to the configuration information sensingPriority-r15 of the first sensing priority or the configuration information sensingPriority-v1560 (or sensingPriority-v1570, or sensingPriority-r1560, Of sensingPriority-r1570) of the second sensing priority and/or the priority indication information $prio_{RX}$.

Optionally, the sidelink user equipment determines that the threshold of the RSRP is equal to the $i^{th}$ threshold in the SL-ThresPSSCH-RSRP-List. Optionally, i=sensingPriority-v1560 (or sensingPriority-v1570, or sensingPriority-r1560, or sensingPriority-r1570)×8+$prio_{RX}$+1, or optionally, i=sensingPriority-r15×8+$prio_{RX}$+1.

Embodiment 7

Figure 9:
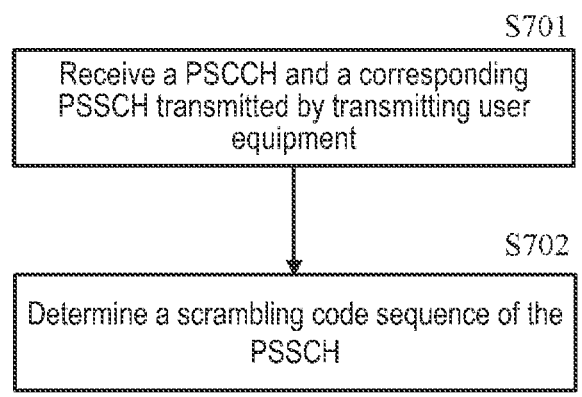
FIG. 9 is a schematic diagram showing a basic procedure of a method performed by user equipment according to Embodiment 7 of the present invention.

FIG. 9 is a schematic diagram showing a basic procedure of a method performed by user equipment according to Embodiment 7 of the present invention.

The method performed by user equipment according to Embodiment 7 of the present invention is described in detail below in conjunction with the basic procedure diagram shown in FIG. 9.

As shown in FIG. 9, in Embodiment 7 of the present invention, steps performed by the user equipment include the following steps.

In step S701, sidelink user equipment receives a PSCCH carrying SCI and a corresponding PSSCH transmitted by transmitting user equipment.

Optionally, the sidelink user equipment determines a source user equipment identifier (source ID) according to the SCI.

Optionally, the sidelink user equipment determines a destination user equipment identifier (destination ID, or target ID) according to the SCI.

Optionally, the sidelink user equipment determines a sidelink link identifier (link ID, or session ID) according to the SCI.

In step S702, the sidelink user equipment determines a scrambling code sequence c(n) of the PSSCH.

Optionally, $c_{init}=SL_{ID}\times 2^x+y$, or $c_{init}=(SL_{ID}\times 2^x+y)\bmod 2^{31}$, where y represents an integer greater than 1023 and less than $2^{x-1}$ such as 1024, 1026, 1028, and 1030, and the value of y includes but is not limited to the above values; and optionally, $SL_{ID}$ is equal to the decimal value of the highest (31−x) bits of a CRC check code of the PSCCH, or $SL_{ID}$ is equal to the decimal value of the lowest (31−x) bits of the CRC check code of the PSCCH. In a specific implementation manner, x=15; the CRC check code of the PSCCH has a length L=24 (represented as $p_0, p_1, \ldots, p_{L-1}$); $SL_{ID}=\Sigma_{i=0}^{15} p_i \times 2^{16-1-i}$, or $SL_{ID}=\Sigma_{i=0}^{23} p_i \times 2^{24-1-i}$. Specific implementation manners include but are not limited to the aforementioned implementation manner.

Optionally, $SL_{ID}$ is equal to the decimal value of the CRC check code of the PSCCH. In a specific implementation manner, the CRC check code of the PSCCH has a length L=24 (represented as $p_0, p_1, \ldots, p_{L-1}$), and $SL_{ID}=\Sigma_{i=0}^{23} p_i \times 2^{24-1-i}$. Specific implementation manners include but are not limited to the aforementioned implementation manner.

Optionally, $SL_{ID}$ is equal to a decimal value corresponding to a concatenate bit sequence of the source ID ($s_0, s_1, \ldots, s_{Maxs-1}$), and/or the destination ID ($d_0, d_1, \ldots, d_{Maxd-1}$), and/or the session ID ($l_0, l_1, \ldots, l_{Maxl-1}$). In a specific implementation manner, x=15; $SL_{ID}=\Sigma_{i=0}^{Maxs-1} s_i \times 2^{Maxs+Maxd-1-i}+\Sigma_{i=0}^{Maxd-1} d_i \times 2^{Maxd-1-i}$, or $SL_{ID}=\Sigma_{i=0}^{Maxd-1} d_i \times 2^{Maxs+Maxd-1-i}+\Sigma_{i=0}^{Maxs-1} s_i \times 2^{Maxs-1-i}$, or $SL_{ID}=\Sigma_{i=0}^{Maxl-1} d_i \times 2^{Maxl-1-i}$. Specific implementation manners include but are not limited to the aforementioned implementation manner.

Embodiment 8

Figure 10:
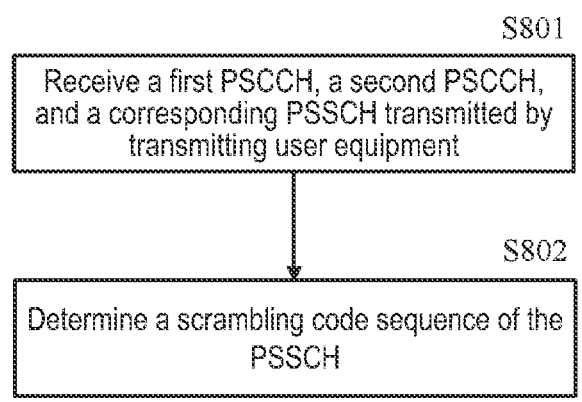
FIG. 10 is a schematic diagram showing a basic procedure of a method performed by user equipment according to Embodiment 8 of the present invention.

FIG. 10 is a schematic diagram showing a basic procedure of a method performed by user equipment according to Embodiment 8 of the present invention.

The method performed by user equipment according to Embodiment 8 of the present invention is described in detail below in conjunction with the basic procedure diagram shown in FIG. 10.

As shown in FIG. 10, in Embodiment 8 of the present invention, steps performed by the user equipment include the following steps.

In step S801, sidelink user equipment receives a first PSCCH carrying first-level SCI, a second PSCCH carrying second-level SCI, and a corresponding PSSCH transmitted by transmitting user equipment.

Optionally, the sidelink user equipment determines a source user equipment identifier (source ID) according to the first-level SCI and/or the second-level SCI.

Optionally, the sidelink user equipment determines a destination user equipment identifier (destination ID, or target ID) according to the first-level SCI and/or the second-level SCI.

Optionally, the sidelink user equipment determines a sidelink link identifier (link ID, or session ID) according to the first-level SCI and/or the second-level SCI.

In step S802, the sidelink user equipment determines a scrambling code sequence c(n) of the PSSCH.

Optionally, $c_{init}=SL_{ID} \times 2^x+y$, or $c_{init}=(SL_{ID} \times 2^x+y) \mod 2^{31}$, where y represents an integer greater than 1023 and less than $2^{x-1}$ such as 1024, 1026, 1028, and 1030, and the value of y includes but is not limited to the above values; and optionally, $SL_{ID}$ is equal to the decimal value of the highest (31−x) bits of a CRC check code of the first PSCCH or the second PSCCH, or $SL_{ID}$ is equal to the decimal value of the lowest (31−x) bits of the CRC check code of the first PSCCH or the second PSCCH. In a specific implementation manner, x=15; the CRC check code of the first PSCCH or the second PSCCH has a length L=24 (represented as $p_0$, $p_1$, . . . , $p_{L-1}$); $SL_{ID}=\Sigma_{i=0}^{15} p_i \times 2^{16-1-i}$, or $SL_{ID}=\Sigma_{i+8}^{23} p_i \times 2^{24-1-i}$. Specific implementation manners include but are not limited to the aforementioned implementation manner.

Optionally, $SL_{ID}$ is equal to the decimal value of the CRC check code of the first PSCCH or the second PSCCH. In a specific implementation manner, the CRC check code of the first PSCCH or the second PSCCH has a length L=24 (represented as $p_0$, $p_1$, . . . , $p_{L-1}$), and $SL_{ID}=\Sigma_{i=0}^{23} p_i \times 2^{24-1-i}$. Specific implementation manners include but are not limited to the aforementioned implementation manner.

Optionally, $SL_{ID}$ is equal to the decimal value of a concatenate sequence of the highest (31−x)/2 bits of the CRC check code of the first PSCCH and the highest (31−x)/2 bits of the CRC check code of the second PSCCH, or $SL_{ID}$ is equal to the decimal value of a concatenate sequence of the lowest (31−x)/2 bits of the CRC check code of the first PSCCH and the lowest (31−x)/2 bits of the CRC check code of the second PSCCH.

Optionally, $SL_{ID}$ is equal to the decimal value of a concatenate sequence of the CRC check code of the first PSCCH and the CRC check code of the second PSCCH.

Optionally, $SL_{ID}$ is equal to a decimal value corresponding to a concatenate bit sequence of the source ID ($s_0$, $s_1$, . . . , $s_{Maxs-1}$), and/or the destination ID ($d_0$, $d_1$, . . . , $d_{Maxd-1}$), and/or the session ID ($l_0$, $l_1$, . . . , $l_{Maxl-1}$). In a specific implementation manner, x=15; $SL_{ID}=\Sigma_{i=0}^{Maxs-1} s_i \times 2^{Maxs+Maxd-1-i}+\Sigma_{i=0}^{Maxd-1} d_i \times 2^{Maxd-1-i}$, or $SL_{ID}=\Sigma_{i=0}^{Maxd-1} d_i \times 2^{Maxs+Maxd-1-i}+\Sigma_{i=0}^{Maxs-1} s_i \times 2^{Maxs-1-i}$, or $SL_{ID}=\Sigma_{i=0}^{Maxl-1} d_i \times 2^{Maxl-1-i}$. Specific implementation manners include but are not limited to the aforementioned implementation manner.

Figure 11:
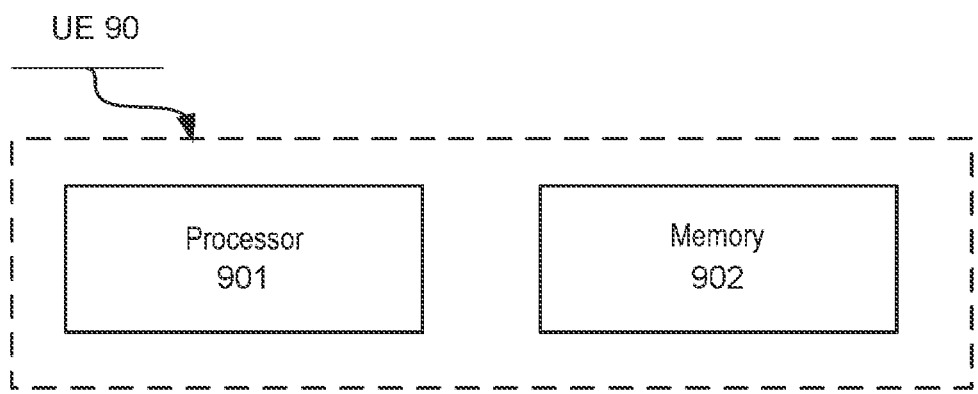
FIG. 11 is a block diagram showing user equipment according to an embodiment of the present invention.

FIG. 11 is a block diagram showing the user equipment (UE) involved in the present invention. As shown in FIG. 11, the user equipment UE90 includes a processor 901 and a memory 902. The processor 901 may include, for example, a microprocessor, a microcontroller, an embedded processor, and the like. The memory 902 may include, for example, a volatile memory (such as a random access memory (RAM)), a hard disk drive (HDD), a non-volatile memory (such as a flash memory), or other memories. The memory 902 stores program instructions. The instructions, when run by the processor 901, can perform the foregoing method performed by user equipment described in detail in the present invention.

The methods and related equipment according to the present invention have been described above in combination with preferred embodiments. It should be understood by those skilled in the art that the methods shown above are only exemplary, and the above embodiments can be combined with one another as long as no contradiction arises. The methods of the present invention are not limited to the steps or sequences illustrated above. The network node and user equipment illustrated above may include more modules. For example, the network node and user equipment may further include modules that can be developed or will be developed in the future to be applied to a base station, an MME, or UE, and the like. Various identifiers shown above are only exemplary, and are not meant for limiting the present invention. The present invention is not limited to specific information elements serving as examples of these identifiers. Those skilled in the art can make various alterations and modifications according to the teachings of the illustrated embodiments.

It should be understood that the above-described embodiments of the present invention may be implemented by software, hardware, or a combination of software and hardware. For example, various components inside the base station and the user equipment in the above embodiments may be implemented through various devices, which include, but are not limited to, analog circuit devices, digital circuit devices, digital signal processing (DSP) circuits, programmable processors, application specific integrated circuits (ASICs), field programmable gate arrays (FPGAs), programmable logic devices (CPLDs), and the like.

In this application, the "base station" may refer to a mobile communication data and control exchange center with large transmission power and a wide coverage area, including functions such as resource allocation and scheduling, data reception and transmission. "User equipment" may refer to a user mobile terminal, for example, including terminal devices that can communicate with a base station or a micro base station wirelessly, such as a mobile phone, a laptop computer, and the like.

In addition, the embodiments of the present invention disclosed herein may be implemented on a computer program product. More specifically, the computer program product is a product provided with a computer-readable medium having computer program logic encoded thereon. When executed on a computing device, the computer program logic provides related operations to implement the above technical solutions of the present invention. When executed on at least one processor of a computing system, the computer program logic causes the processor to perform the operations (methods) described in the embodiments of the present invention. Such setting of the present invention is typically provided as software, codes and/or other data structures provided or encoded on the computer readable medium, e.g., an optical medium (e.g., compact disc read-only memory (CD-ROM)), a flexible disk or a hard disk and the like, or other media such as firmware or micro codes on one or more read-only memory (ROM) or random access memory (RAM) or programmable read-only memory (PROM) chips, or a downloadable software image, a shared database and the like in one or more modules. Software or firmware or such configuration may be installed on a computing device such that one or more processors in the computing device perform the technical solutions described in the embodiments of the present invention.

In addition, each functional module or each feature of the base station device and the terminal device used in each of the above embodiments may be implemented or executed by a circuit, which is usually one or more integrated circuits. Circuits designed to execute various functions described in this description may include general-purpose processors, digital signal processors (DSPs), application specific integrated circuits (ASICs) or general-purpose integrated circuits, field programmable gate arrays (FPGAs) or other programmable logic devices, discrete gates or transistor logic, or discrete hardware components, or any combination of the above. The general purpose processor may be a microprocessor, or the processor may be an existing processor, a controller, a microcontroller, or a state machine. The aforementioned general purpose processor or each circuit may be configured by a digital circuit or may be configured by a logic circuit. Furthermore, when advanced technology capable of replacing current integrated circuits emerges due to advances in semiconductor technology, the present invention can also use integrated circuits obtained using this advanced technology.

While the present invention has been illustrated in combination with the preferred embodiments of the present invention, it will be understood by those skilled in the art that various modifications, substitutions, and alterations may be made to the present invention without departing from the spirit and scope of the present invention. Therefore, the present invention should not be limited by the above-described embodiments, but should be defined by the appended claims and their equivalents.

The invention claimed is:
1. A method performed by a user equipment, the method comprising:
   receiving a sensing measurement configuration via a Radio Resource Control (RRC) Information Element (IE): MeasSensing-Config, wherein the MeasSensing-Config includes a sensing priority configuration (sensingPriority-r15), and the sensingPriority-r15 is any of integer values 1 to 8;
   receiving a list of Reference Signal Receiving Power (RSRP) thresholds via an RRC IE: SL-ThresPSSCH-RSRP-List;
   receiving Sidelink Control Information (SCI) format 1, wherein the SCI includes a priority indication m, the priority indication has 3 bits, and the m is any of integer values 0 to 7; and
   determining an RSRP threshold as an i-th field included in the SL-ThresPSSCH-RSRP-List, wherein the i=(sensingPriority-r15-1)*8+m+1.
2. A user equipment, comprising:
   a reception circuitry is configured to:
      receive a sensing measurement configuration via a Radio Resource Control (RRC) Information Element (IE): MeasSensing-Config, wherein the MeasSensing-Config includes a sensing priority configuration (sensingPriority-r15), and the sensingPriority-r15 is any of integer values 1 to 8,
      receive a list of Reference Signal Receiving Power (RSRP) thresholds via an RRC IE: SL-ThresPSSCH-RSRP-List, and
      receive Sidelink Control Information (SCI) format 1, wherein the SCI includes a priority indication m, the priority indication has 3 bits, and the m is any of integer values 0 to 7; and
   a determination circuitry is configured to determine an RSRP threshold as an i-th field included in the SL-ThresPSSCH-RSRP-List, wherein the i=(sensingPriority-r15-1)*8+m+1.

* * * * *